United States Patent
Mauvais et al.

(10) Patent No.: US 10,388,416 B2
(45) Date of Patent: Aug. 20, 2019

(54) MOTOR-DRIVEN CENTRIFUGAL PUMP FOR THE PRIMARY CIRCUIT OF SMALL OR MEDIUM-SIZED MODULAR NUCLEAR REACTORS

(71) Applicant: CLYDE UNION S.A.S., Annecy (FR)

(72) Inventors: Stéphane Mauvais, Annecy (FR); Bruno Soudy, Annecy (FR); Cécile Bras, Annecy (FR); Sylvain Stihle, Annecy (FR); Olivier Caregnato, Annecy (FR)

(73) Assignee: CLYDE UNION S.A.S., Annecy (FR)

( * ) Notice: Subject to any disclaimer, the term of this patent is extended or adjusted under 35 U.S.C. 154(b) by 331 days.

(21) Appl. No.: 15/028,843

(22) PCT Filed: Oct. 17, 2014

(86) PCT No.: PCT/EP2014/072351
§ 371 (c)(1),
(2) Date: Apr. 12, 2016

(87) PCT Pub. No.: WO2015/055833
PCT Pub. Date: Apr. 23, 2015

(65) Prior Publication Data
US 2016/0254066 A1  Sep. 1, 2016

(30) Foreign Application Priority Data
Oct. 17, 2013 (FR) ..................... 13 60133

(51) Int. Cl.
*F04D 13/00* (2006.01)
*G21C 15/243* (2006.01)
(Continued)

(52) U.S. Cl.
CPC ............. *G21C 15/243* (2013.01); *F04D 7/08* (2013.01); *F04D 13/06* (2013.01);
(Continued)

(58) Field of Classification Search
CPC ........ F16D 41/18; F16D 41/185; F16D 43/04; G21C 15/243; F04D 13/0606;
(Continued)

(56) References Cited

U.S. PATENT DOCUMENTS 1,334,291 A * 3/1920 Constantinesco ....... F16H 43/02
                                                            192/58.91
1,499,923 A   7/1924 Hall
(Continued)

FOREIGN PATENT DOCUMENTS

CN         2752499 Y    1/2006
CN       201155475 Y   11/2008
(Continued)

OTHER PUBLICATIONS

D. Testa and A. Kunkle "The Westinghouse pressurized water reactor nuclear power plant" Westinghouse Electric Corporation Water Reactor Divisions (1984), pp. 41-47.

*Primary Examiner* — Christopher S Bobish
(74) *Attorney, Agent, or Firm* — Baker & Hostetler LLP

(57) ABSTRACT

A motor-driven centrifugal pump for circulating a coolant in a primary circuit of a nuclear reactor comprises a sealed motor unit, a hydraulic part and a shaft which is immersed in the coolant, turned by the sealed motor unit and pumping the coolant by an impeller of the hydraulic part secured to the shaft. The motor unit comprises a dry stator and an immersed rotor, mounted securely on the shaft. The motor-driven pump also comprises an immersed flywheel mounted securely on the shaft between the rotor of the motor unit and the impeller of the hydraulic part, allowing a minimum slowing-down time after the electrical power supply is cut; and an immersed anti-backspin device, configured to mechanically block the rotation of the shaft in a predetermined direction.

11 Claims, 7 Drawing Sheets

(51) Int. Cl.
*F16D 41/18* (2006.01)
*F16D 43/04* (2006.01)
*F04D 13/06* (2006.01)
*F04D 7/08* (2006.01)
*F04D 15/00* (2006.01)
*F04D 29/58* (2006.01)
*H02K 7/02* (2006.01)
*H02K 5/173* (2006.01)
*H02K 5/20* (2006.01)
*H02K 7/08* (2006.01)
*H02K 7/10* (2006.01)
*H02K 7/14* (2006.01)
*H02K 9/19* (2006.01)
*F04D 25/06* (2006.01)
*H02K 5/12* (2006.01)

(52) U.S. Cl.
CPC ..... *F04D 13/0606* (2013.01); *F04D 13/0653* (2013.01); *F04D 15/0077* (2013.01); *F04D 25/06* (2013.01); *F04D 29/5806* (2013.01); *F16D 41/18* (2013.01); *F16D 41/185* (2013.01); *F16D 43/04* (2013.01); *H02K 5/1732* (2013.01); *H02K 5/20* (2013.01); *H02K 7/02* (2013.01); *H02K 7/083* (2013.01); *H02K 7/10* (2013.01); *H02K 7/14* (2013.01); *H02K 9/19* (2013.01); *F04C 2270/72* (2013.01); *H02K 5/12* (2013.01); *Y02E 30/40* (2013.01); *Y02E 60/16* (2013.01); *Y02E 70/30* (2013.01); *Y10T 74/2121* (2015.01)

(58) Field of Classification Search
CPC .... F04D 13/0653; F04D 15/0077; F04D 7/02; F04D 7/08; F04C 2270/72; F05B 2270/72; Y10T 74/2121
See application file for complete search history.

(56) References Cited

U.S. PATENT DOCUMENTS

| | | | | |
|---|---|---|---|---|
| 2,564,838 | A * | 8/1951 | Garey | F04D 15/0077 403/81 |
| 2,962,128 | A * | 11/1960 | Luenberger | F16D 41/00 188/82.84 |
| 3,518,031 | A * | 6/1970 | Randall | F25B 31/02 192/45.017 |
| 3,656,591 | A * | 4/1972 | Marland | F16D 41/067 188/82.84 |
| 3,716,732 | A * | 2/1973 | Tillma | H02K 5/1672 310/61 |
| 4,084,924 | A * | 4/1978 | Ivanoff | F04D 13/0653 416/60 |
| 4,350,235 | A * | 9/1982 | Brownett | F16D 41/086 188/82.84 |
| 4,886,430 | A | 12/1989 | Veronesi et al. | |
| 5,165,305 | A * | 11/1992 | Veronesi | F04D 13/02 219/117.1 |
| 5,199,857 | A * | 4/1993 | Sanuki | F04B 11/005 417/223 |
| 5,276,945 | A * | 1/1994 | Matsumura | A47K 13/10 16/337 |
| 5,356,273 | A * | 10/1994 | Nixon | F04D 29/0413 417/370 |
| 5,498,143 | A * | 3/1996 | Dreiman | F04C 18/0215 184/6.18 |
| 5,503,541 | A * | 4/1996 | Barito | F04C 28/28 192/223.1 |
| 5,551,510 | A * | 9/1996 | Mills | E21B 43/126 166/68 |
| 6,046,522 | A * | 4/2000 | Ko | H02K 7/1185 192/45.005 |
| 6,135,740 | A * | 10/2000 | Hult | E21B 43/126 166/68 |
| RE37,837 | E * | 9/2002 | Shoulders | F04C 28/22 418/14 |
| 6,544,017 | B1 * | 4/2003 | Skinner | F04C 28/28 418/1 |
| 7,066,723 | B2 * | 6/2006 | Joo | F04C 28/28 418/55.1 |
| 8,590,419 | B2 * | 11/2013 | Finegan | F04D 13/02 376/210 |
| 9,027,717 | B2 * | 5/2015 | Hult | E21B 43/126 188/184 |
| 2008/0199339 | A1 * | 8/2008 | Near | F04C 2/00 |

FOREIGN PATENT DOCUMENTS

| | | |
|---|---|---|
| DE | 37 24 219 A1 | 2/1988 |
| DE | 38 36 563 A1 | 5/1989 |
| EP | 1910685 B1 | 4/2009 |
| FR | 2 573 489 A1 | 5/1986 |
| JP | 62-64161 U | 4/1987 |
| JP | 64-32196 A | 2/1989 |
| JP | 2-11890 A | 1/1990 |
| JP | 2-38994 A | 2/1990 |
| JP | 5-312986 A | 11/1993 |
| JP | 7-42687 A | 2/1995 |
| JP | 7-71393 A | 3/1995 |
| JP | 2000162361 A | 6/2000 |
| JP | 2000338287 A | 12/2000 |
| WO | 2009/148850 A1 | 12/2009 |

* cited by examiner

MOTOR-DRIVEN CENTRIFUGAL PUMP FOR THE PRIMARY CIRCUIT OF SMALL OR MEDIUM-SIZED MODULAR NUCLEAR REACTORS

CROSS-REFERENCE TO RELATED APPLICATIONS

This application is a National Stage of International patent application PCT/EP2014/072351, filed on Oct. 17, 2014, which claims priority to foreign French patent application No. FR 1360133, filed on Oct. 17, 2013, the disclosures of which are incorporated by reference in their entirety.

FIELD OF THE INVENTION

The present invention relates to the field of primary motor-driven pump units which provide the cooling of the nuclear reactor and circulate a coolant through the primary circuit, and relates more particularly to a design of motor-driven primary pump that is suited to small and medium-sized modular reactors.

BACKGROUND

Unlike the more powerful nuclear reactors capable of distributing an electrical power in excess of 1000 MW, the small and medium modular reactor sector, commonly referred to as SMRs which stand for Small Modular Reactors, is undergoing substantial expansion. Many designs of SMR are in progress, generally in the 50 to 700 MW range (<300 MW for small reactors; <700 MW for medium reactors). Being less expensive and more flexible than traditional installations, SMRs provide the answer to the increasing need for electrical energy, particularly in the developing countries.

The modular construction of the SMRs allows production capacity to be increased incrementally by using the number of modules that suits the need. Being more compact, they can be partially prefabricated prior to transport and assembled on the final end-user site. Designed as a plug and play solution, SMR installations can be built more quickly, offering greater flexibility in terms of financing, in terms of the scope of installation work to be carried out on site, in terms of the size and the end-use.

There are a number of reactor types envisioned for SMRs particularly pressurized water reactors (PWRs), high temperature reactors (HTRs) or even molten salt reactors (MSRs). In PWRs, the ordinary water that constitutes the coolant is kept liquid under high pressure, of the order of 150 bar. In the primary circuit, the water collects the heat produced by the nuclear fuel and transmits it to the fluid of the secondary circuit using steam generators. In the integrated PWRs envisioned for the SMRs, one or more steam generator(s) is/are situated in the same enclosures as the reactor. The heat from the reactor is transmitted by the secondary circuit to a steam turbine which drives an alternator tasked with producing electricity.

One or more primary pumps circulate the water through the primary circuit, between the reactor core and the steam generators. The primary coolant pump is a component essential to the operation and safety of a PWR facility. The design of SMRs entails a rethink of the architecture of the primary pump because the architecture of an integrated PWR which has the reactor, the primary circuit and the steam generators in one module imposes new requirements, both geometric and functional, and in terms of durability, or safety requirements.

The ambitious specification sheet for a reactor that is simple, compact, inexpensive and meets the most stringent safety requirements, is logically passed on to its constituent parts. Existing primary pumps are illustrated to this new requirement. By way of nonlimiting example of the present invention, a motor-driven primary pump suited to an SMR has, by way of functional requirements, a durability of 60 years, a motor-driven pump inlet fluid temperature of between 300 and 350° C., an operating pressure of 140 to 160 bar, a coolant density of between 600 and 700 $kg/m^3$, and a raft of geometric requirements (e.g. the ability to mount vertically or horizontally, the overall size envelope), installation requirements (e.g. the fact that it must not be installed by welding, that it must be possible to disconnect it completely from outside the reactor, without components remaining inside the enclosure), and external requirements (e.g. seismic requirements).

Thus, it is desirable to have a motor-driven primary pump that meets these new and ambitious requirements. The suitable motor-driven primary pump will need to be of simple design, robust, economical, compatible with mass production, and meet the most stringent functional and regulatory requirements.

SUMMARY OF THE INVENTION

To this end, the subject of the invention is a motor-driven centrifugal pump for circulating a coolant in a primary circuit of a nuclear reactor. The motor-driven pump comprises a sealed motor unit, a hydraulic part and a shaft which is immersed in the coolant, turned by the sealed motor unit and pumping the coolant by means of an impeller of the hydraulic part secured to the shaft. The motor unit comprises a dry stator and an immersed rotor, mounted securely on the shaft. The motor-driven pump also comprises an immersed flywheel mounted securely on the shaft between the rotor of the motor unit and the impeller of the hydraulic part, making it possible to ensure a minimum slowing-down time when the motor unit ceases to turn the shaft; and an immersed anti-backspin device, configured to mechanically block the rotation of the shaft in a predetermined direction.

Advantageously, the immersed anti-backspin device comprises a fixed part and a mobile part secured to the shaft. The mobile part comprises at least one cavity facing the fixed part, and at least one mobile pin, held inside said cavity by the effect of centrifugal force, and partially leaving the cavity under the effect of gravity, when the rotational speed of the mobile part drops below a predetermined threshold. The fixed part comprises at least one ramp made up of two inclined planes, a first plane of shallow gradient and a second plane of steep gradient. The anti-backspin device is configured in such a way that below the predetermined speed threshold:

said pin is pushed back into the cavity by contact with the shallow-gradient inclined plane, when the mobile part is turning in a permitted direction of rotation, said pin portion outside the cavity blocks the rotation of the mobile part in the opposite direction through contact with the steep-gradient inclined plane.

Advantageously, the mobile part of the anti-backspin device is formed in the flywheel, forming an integrated subassembly.

Advantageously, the at least one pin is externally of substantially cylindrical shape along a main axis. The cavity has a suitable internal shape, substantially cylindrical along the main axis of the pin.

Advantageously, the at least one pin comprises an open-ended duct substantially parallel to the main axis of the pin making it easier for the coolant to flow inside the cavity as said pin moves.

Advantageously, the at least one pin comprises a chamfered profile or a rounded profile at least at one end to make it easier for said pin to ascend the first plane and to limit the impact between the mobile part and the fixed part.

Advantageously, the anti-backspin device comprises a plurality of pins and of cavities formed at equal distances from the axis of rotation of the shaft and evenly angularly distributed in the mobile part, and the same number of ramps evenly distributed on the fixed part, so that rotational blocking is the result of contact of each of the pins with a ramp.

Advantageously, the anti-backspin device comprises a plurality of pins and of cavities formed at equal distances from the axis of rotation of the shaft and evenly distributed in the mobile part and a distinct number of ramps evenly distributed on the fixed part, so that rotational blocking is the result of contact of a single pin with a ramp.

Advantageously, at least a surface portion of the at least one ramp, of the at least one pin or of the at least one cavity is mechanically strengthened by a surface-hardening process.

Advantageously, at least one portion of the at least one ramp, of the at least one pin or of the at least one cavity is made of a metal alloy having enhanced mechanical strength.

Advantageously, the motor-driven pump comprises a thermal barrier between the motor unit and the hydraulic part in order to thermally isolate the motor unit from the primary circuit. The shaft passes through the thermal barrier between the flywheel and the impeller.

Advantageously, the fixed part is formed on a surface of the thermal barrier facing the mobile part.

Advantageously, the motor-driven pump is mounted vertically. the at least one cavity is configured to allow a vertical movement of the pin in the cavity. The rotational speed dropping below the predetermined threshold causes all the pins of the anti-backspin device to drop.

Advantageously, the motor-driven pump is mounted horizontally. The at least one cavity is configured to allow a radial movement of the pin in the cavity. The rotational speed dropping below the predetermined threshold causes some of the pins of the anti-backspin device to drop.

BRIEF DESCRIPTION OF THE DRAWINGS

The invention will be better understood and further advantages will become apparent from reading the detailed description of some embodiments given by way of example in the following figures.

For the sake of clarity, the same elements will bear the same references in the various figures.

DETAILED DESCRIPTION

Figure 1B:
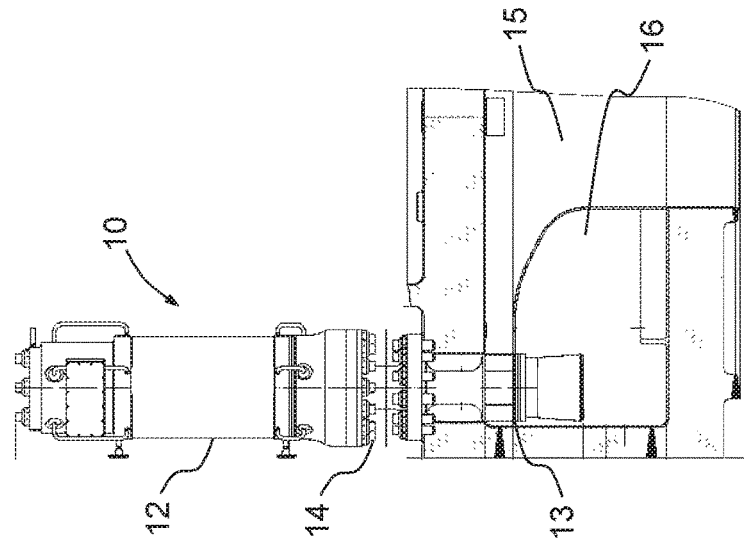
Figures 1 *a* and 1 *b* illustrate a motor-driven primary pump according to the invention and how it is integrated in a vertical configuration into an SMR.
Figure 1A:
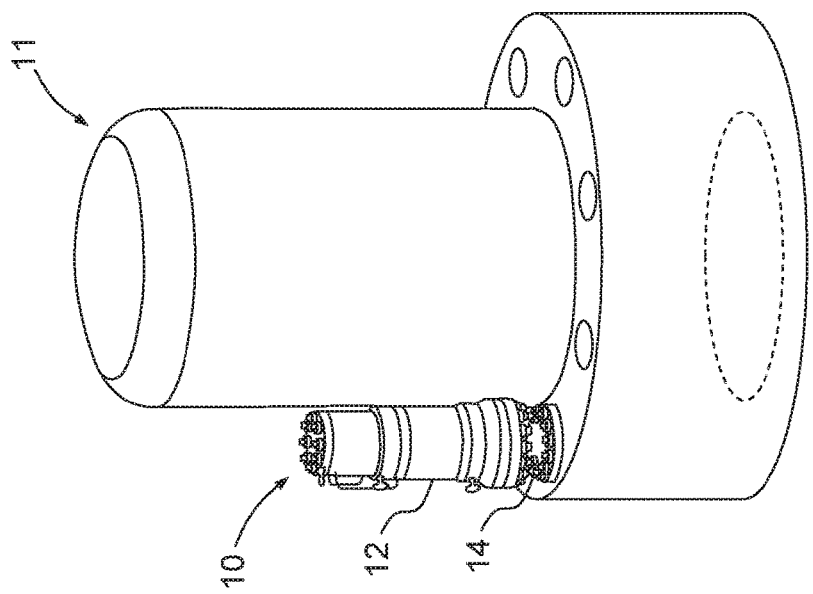

FIGS. 1*a* and 1*b* illustrate a motor-driven primary pump according to the invention and its integration in a vertical configuration into an SMR. FIG. 1*a* depicts the upper part of a reactor 11 and a motor-driven primary pump 10 according to the invention. The upper part of the reactor 11 comprises a pressurizer in which the coolant is kept at high pressure and high temperature under the effect of the controlled nuclear reaction in a lower part of the reactor 11. The reactor primary circuit comprises one or more motor-driven pumps which circulate fluid between the pressurizer and one or more steam generator(s). The upper part of the reactor 11 depicted in FIGS. 1*a* and 1*b* comprises a dome-shaped part and a substantially cylindrical base. FIG. 1*a* depicts the reactor 11 equipped with just one motor-driven primary pump 10 in order to make the diagram easier to comprehend. However, it is envisioned that there will be several motor-driven primary pumps fixed to the substantially cylindrical base of the upper part of the reactor 11, and around this upper part. In FIG. 1*a*, eight motor-driven primary pumps may be arranged around the base, the connection interfaces of the eight pumps are visible in the diagram. In this example, the design of the reactor dictates that the motor-driven primary pump be mounted vertically, head down. The motor-driven primary pump 10 comprises a motor unit 12 and a hydraulic part 13 which are separated by a thermal barrier 14. The base comprises part of the primary circuit. As depicted in FIG. 1*b*, the primary pumps are connected to a common manifold 15 connected to the reactor core. The coolant is pumped to a common discharge enclosure 16 connected to the steam generators. Note too that the fact that the motor-driven pump is integrated into a very tightly confined environment, notably very close to the walls of the reactor places a great deal of constraints on the design of the motor-driven pump, notably in terms of the flow of the fluid upstream of the impeller, through the impeller and downstream thereof.

The motor-driven primary pump and its integration into the reactor, which are illustrated in FIGS. 1*a* and 1*b*, are given by way of example and do not limit the present invention. In this example, the motor-driven pump is in a vertical configuration, the coolant is ordinary water. More generally, the invention relates to a motor-driven centrifugal pump for circulating a coolant in a primary circuit of a nuclear reactor.

Figure 2B:
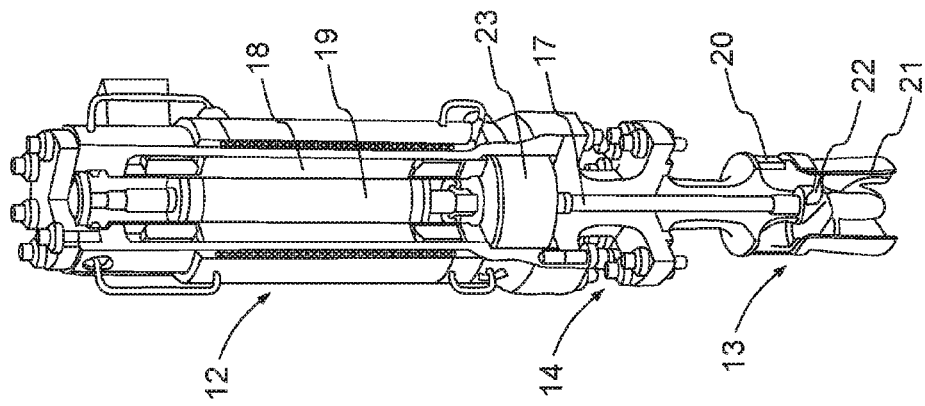
FIGS. 2*a*, 2*b* and 2*c* depict the motor-driven primary pump according to a preferred embodiment of the present invention, FIG. 3 describes a set of bearings used in the preferred embodiment of the invention, FIGS. 4*a* and 4*b* describe a flywheel equipped with a vaned wheel used in the preferred embodiment of the invention, FIGS. 5*a* and 5*b* describe an external cooling circuit used in the preferred embodiment of the invention.
Figure 2A:
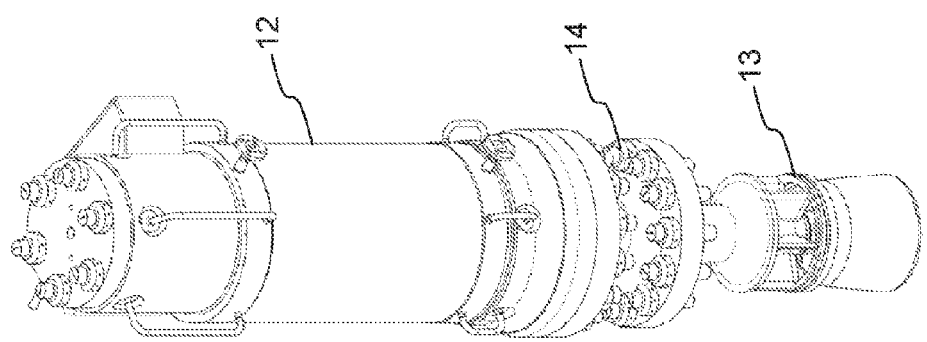
Figure 2C:
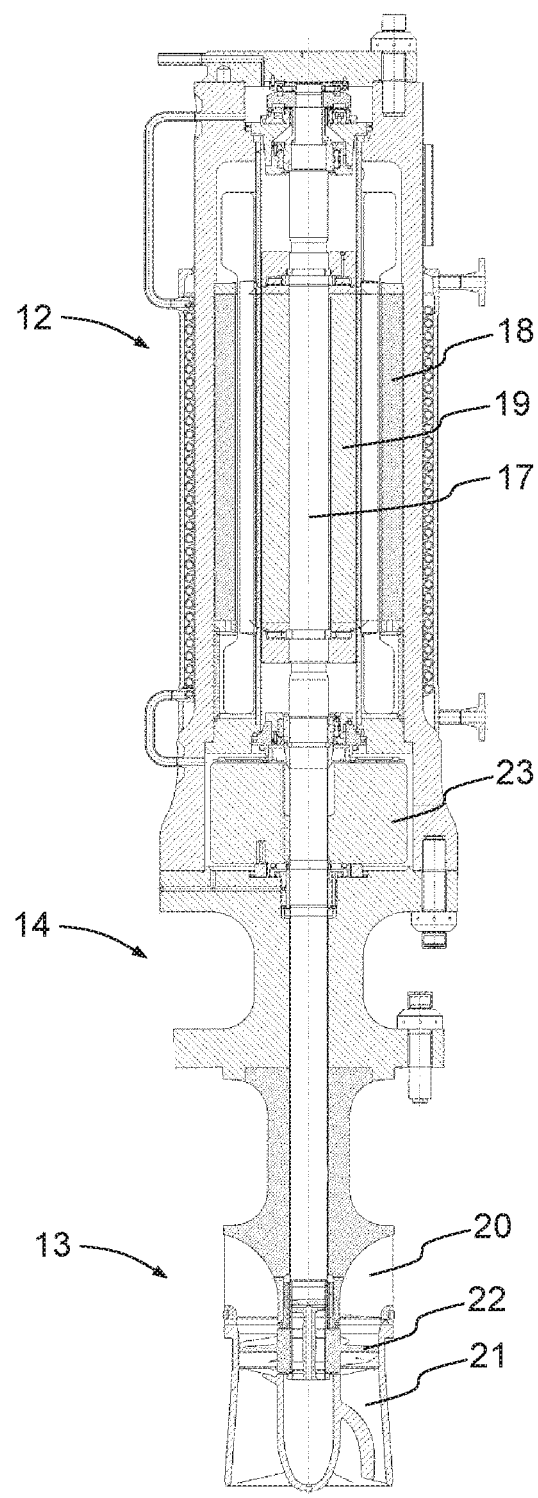

FIGS. 2*a*, 2*b* and 2*c* depict the motor-driven primary pump according to a preferred embodiment of the present invention. The motor-driven primary pump is a motor-driven centrifugal pump comprising a sealed motor unit 12, a hydraulic part 13 which is separated by a thermal barrier 14. These three elements have passing through them a shaft 17 rotating about a longitudinal axis. The rotationally mobile assembly is immersed in the coolant of the primary circuit.

The motor unit 12 comprises a dry stator 18 and an immersed rotor 19 mounted securely on the shaft 17, which turns the shaft 17 and therefore the mobile elements of the hydraulic part 13.

The hydraulic part 13 comprises an intake duct 20, connected to the common manifold 15, and a discharge duct 21 connected to the common discharge enclosure 16, these ducts being separated by an impeller 22 secured to the shaft. Rotation of the impeller 22, driven by the shaft 17, allows the coolant to be pumped.

The thermal barrier 14 comprises means of fixing the motor-driven pump to the reactor. These fixing means are preferably of the stud-nut type so as to allow ease of disassembly of the motor-driven pump. The thermal barrier 14 separates the motor-driven pump between a cold part comprising the motor unit 12 and a hot part comprising the hydraulic part 13 connected to the primary circuit. Typically, a temperature of between 70° C. and 160° C. is sought for the cold part, while the hot part is close to the temperature of the coolant, i.e. between 300 and 350° C. To achieve that, the motor-driven primary pump according to the invention comprises a cooling circuit described in detail hereinafter.

The cooling of the reactor is a deciding element in the safety of the reactor. In the event of failure of the motor-driven pump or of the electrical network powering same, it is necessary to maintain a significant fluid flow rate in order to maintain a flow of coolant and therefore maintain a minimum amount of reactor cooling. By way of example, this requirement can be expressed quantitatively in terms of the requirement to maintain a flow rate greater than or equal to 50% of the nominal flow rate 3 seconds after the motor stops as a result of a break in the electrical power supply. It so happens that the inertia of the shaft and of the rotor are not sufficient to meet this type of requirement. For that reason, the motor-driven pump also comprises an immersed flywheel 23 mounted securely on the shaft 17 between the hot part and the cold part of the motor-driven pump or, in other words, between the rotor 19 of the motor unit 12 and the impeller 22 of the hydraulic part 13. The flywheel makes it possible to maintain a sufficient coolant flow rate for several seconds after a stoppage or failure of the electrical power supply. Advantageously, the flywheel also makes it possible to smooth the rotational speed of the shaft 17 and limit jerks when the motor-driven pump is started or stopped. The flywheel also constitutes a radiological barrier making it possible to limit radioactive emissions that may escape from the reactor through the motor-driven pump connection interface. The specification of the flywheel has a direct impact on the inertia of the shaft, the friction losses and therefore the power of the motor and the capacity of the cooling circuit. It is advantageous to have a flywheel in the form of a thick disk, mounted securely on the shaft and made of a material of high density, greater than that of stainless steel, and preferably greater than 8 kg/l. Advantageously, the flywheel is made of an alloy based on nickel and chromium, preferably of the $NiCr_{22}Mo_9Nb$ alloy known by its registered trade name of Inconel 625.

Figure 3:
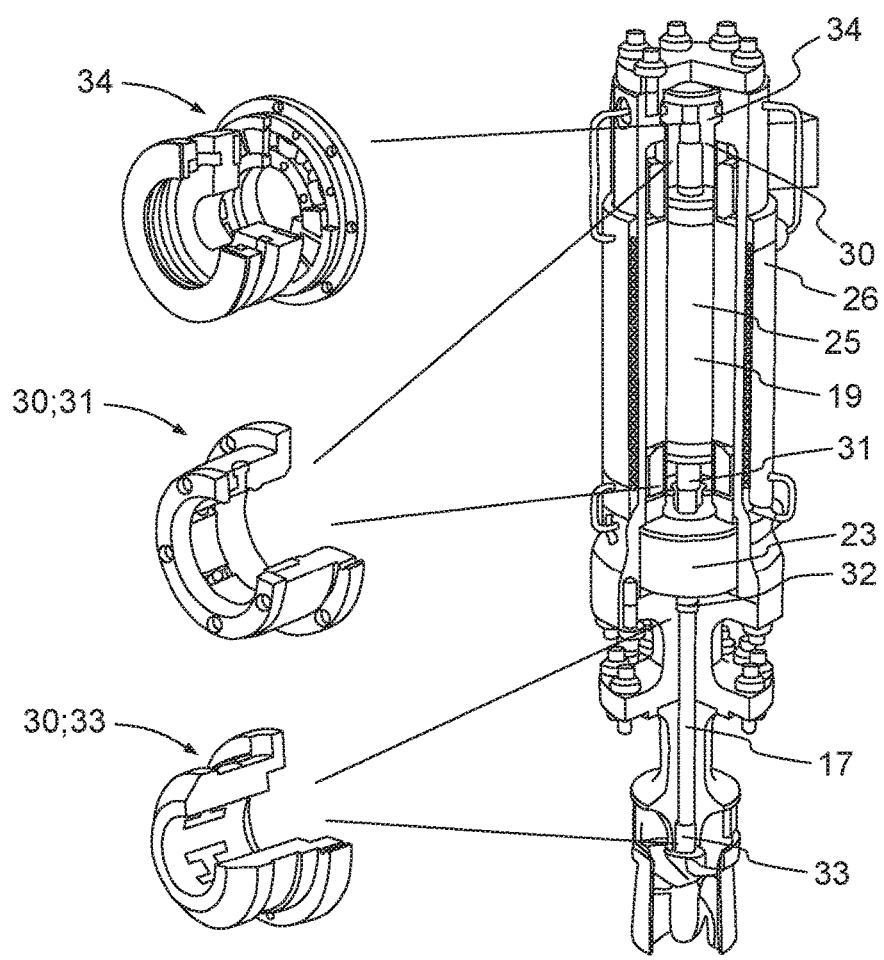

FIG. 3 describes a set of bearings used in the preferred embodiment of the invention to ensure reliable rotor dynamics. The shaft 17 and the components connected to it, particularly the rotor 19, the flywheel 23 and the impeller 22, forms an assembly 25 with rotational mobility with respect to a motor-driven pump body 26 made up of the fixed elements of the motor unit, of the hydraulic part and of the thermal barrier 14. The mobile assembly 25 is immersed in the coolant circulating through the motor-driven pump. The motor-driven pump comprises a set of bearings which are lubricated by the coolant being pumped, ensuring that the mobile assembly 25 can rotate with respect to the motor-driven pump body 26. In the preferred embodiment depicted in FIG. 3, the set of bearings comprises:

a first radial bearing 30 positioned between the rotor 19 and an upper end of the shaft, a second radial bearing 31 positioned between the rotor and the flywheel, a third radial bearing 32 positioned near the flywheel and on the opposite side of the flywheel to the second bearing, a fourth radial bearing 33 positioned near the impeller 22.

The first and second radial bearings 30 and 31 guide the rotation of the shaft 17 in a fixed part of the motor unit 12. They guide the rotation of the immersed rotor 19 with respect to the dry stator 18. These bearings 30 and 31 are situated in the cold part of the motor-driven pump.

Advantageously, the bearings 30 and 31 are plain bearings or pad-type bearings and preferably pad-type bearings comprising five pads made of silicon carbide with the registered trade name Ekasic, and a stainless steel bushing with a tungsten carbide surface treatment.

The third and fourth radial bearings 32 and 33 guide the rotation of the shaft 17 in a fixed part of the thermal barrier 14. These bearings 32 and 33 are situated in the hot part of the motor-driven pump. Advantageously, the bearings 32 and 33 are of the hydrostatic and/or three-lobed bearing type. They may be made from an alloy of the stellite or Colmonoy® type or may have a surface hardening, obtained by means of a surface treatment or by means of a coating.

The set of bearings of the motor-driven pump also comprises an axial bearing 34 positioned near the first radial bearing 30 to block the axial movement of the shaft. In order to allow ease of disassembly of the motor-driven pump via the upper part thereof that is freely accessible, it is advantageous for the axial bearing 34 to be positioned between the rotor and the upper end of the shaft. Advantageously, the axial bearing 34 is made up of a tilting-pad bearing preferably comprising fifteen pads made of silicon carbide with the registered trade name Ekasic G, and a disk made of silicon carbide with the registered trade name Ekasic C.

Figure 4A:
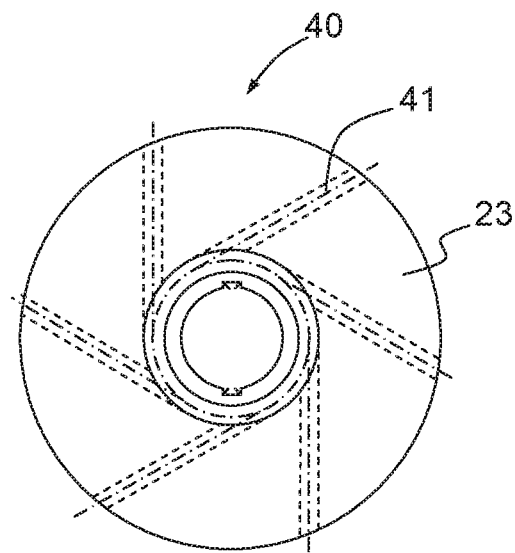
Figure 4B:
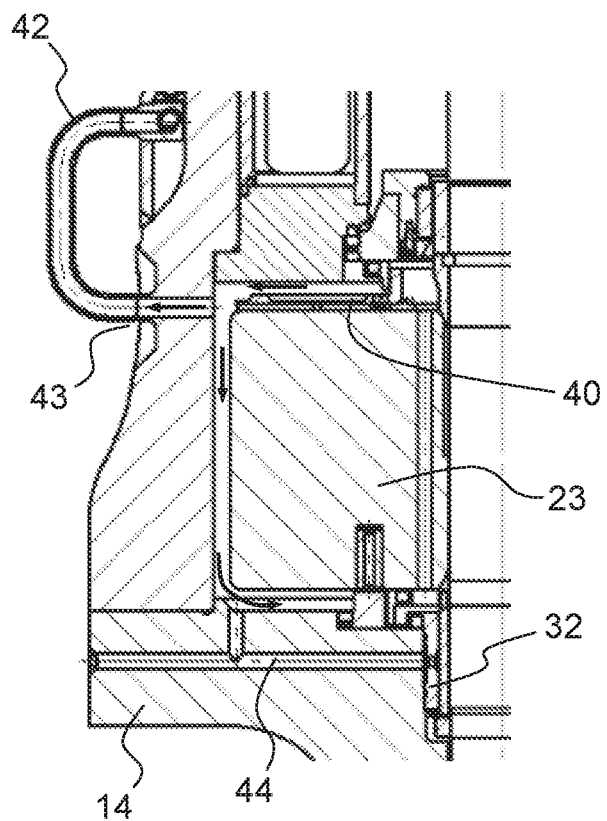

FIGS. 4a and 4b describe a flywheel equipped with a vaned wheel used in the preferred embodiment of the invention. The rotationally mobile assembly is immersed in the coolant. It is therefore naturally raised to a high temperature. The relatively high rotational speeds of the shaft (typically of between 2000 and 4000 revolutions per minute) generate heat in the bearings and more generally at the rotating parts such as the flywheel 23 and the immersed rotor 19. For that reason it is necessary to cool the motor-driven pump and notably the motor unit 12. According to one particularly advantageous feature of the present invention, the flywheel 23 comprises a vaned wheel 40 which causes a circulation of the coolant that allows the motor unit to be cooled.

The idea is to use the rotation of the shaft to generate movement in the fluid near the moving parts that are to be cooled. There are a number of embodiments envisioned for this vaned wheel. It may be made up of channels or grooves formed on a surface of the flywheel. In the preferred embodiment of the invention, as depicted in FIGS. 4a and 4b, the vaned wheel 40 comprises a plurality of straight fins 41 formed on the upper surface of the flywheel 23; the upper surface of the flywheel being the surface facing toward the rotor. It generates a circulation of fluid symbolized by the arrows in FIG. 4b. This circulation on the one hand allows fluid to be fed to an external cooling circuit 42 that will be described hereinafter, and on the other hand allows a stream of fluid to be generated around the flywheel 23, from the cold part toward the hot part of the motor-driven pump. This stream of fluid notably provides lubrication for the third radial bearing 32 positioned under the flywheel. In the preferred embodiment depicted in the figures, the third bearing is a hydrostatic and/or three-lobed bearing. In that case, a feed duct 44 is advantageously formed in the thermal barrier 14 so that the coolant can lubricate the third radial bearing 32, as a result of the circulation of coolant fluid generated by the vaned wheel 40.

Use of this circulation of coolant caused by a vaned wheel formed on the flywheel is particularly advantageous because it at once allows direct cooling of certain components, lubrication of bearings and a supply of coolant to an external cooling circuit while at the same time limiting friction losses. That makes it possible effectively to make a separation at the flywheel between a cold part, i.e. a temperature of the order of 80° C. at the upper surface of the flywheel, and a hot part, i.e. temperature of the order of 150° C. at the lower surface of the flywheel.

In an alternative configuration, it is envisioned for the vaned wheel to be formed on the lower surface of the flywheel.

Figure 5B:
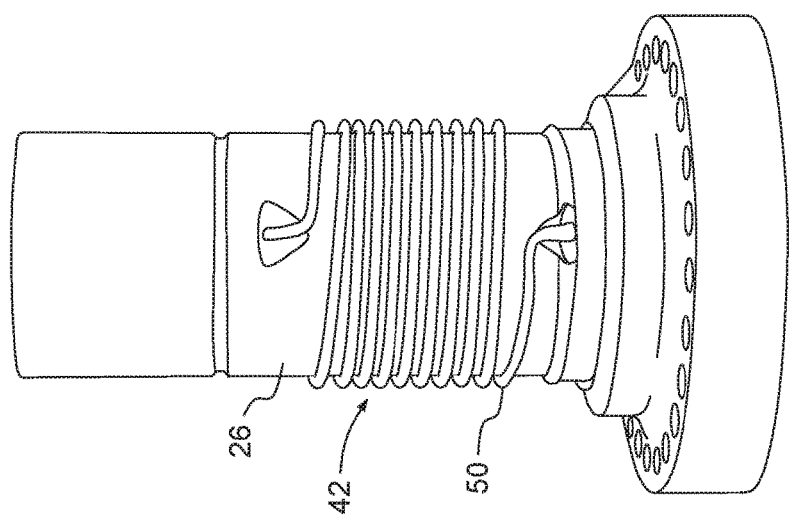
Figure 5A:
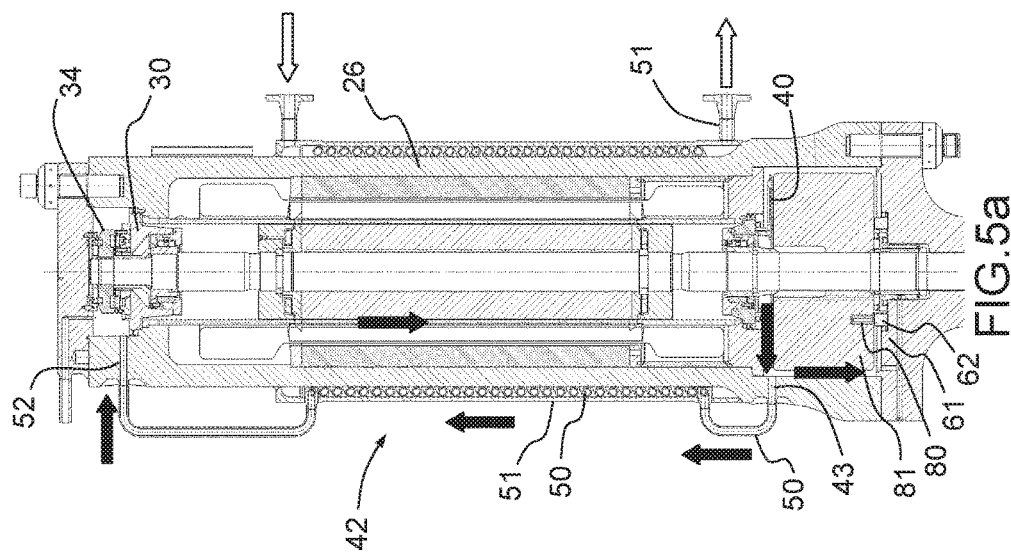

FIGS. 5a and 5b describe an external cooling circuit used in the preferred embodiment of the invention. The external cooling circuit 42 through which the coolant driven by the vaned wheel 40 of the flywheel 23. The cooling circuit 42 comprises one or more coils 50 wound around the motor-driven pump body 26. The coolant circulating through the at least one coil 50 is cooled by means of a secondary coolant circulating around the body 26 in a cylindrical shell 51. The hydraulic circuit of the secondary coolant, referred to as the secondary circuit, which allows the secondary coolant to be pressurized and cooled, has not been depicted. Any conventional circuit is suited to the present invention.

The external cooling circuit 42 at once allows cooling of the coolant by exchange of heat across the wall of the at least one coil 50 and direct cooling of the motor-driven pump by the wall of the motor-driven pump body 26.

The acceleration of the coolant that is transmitted by the vaned wheel 40 allows the at least one coil 50 to be fed via the feed duct 43 formed in the motor-driven pump body 26. The coolant is cooled as it passes through the coil and is then reintroduced into the motor unit near the upper end of the rotor. Advantageously, the fluid is reintroduced via a feed duct 52 formed in the motor-driven pump body 26 facing the first radial bearing 30 and/or the axial bearing 34. The vaned wheel 40 collaborating with the external cooling circuit 42 thus generates a fluid circuit that allows the sealed unit to be kept inside a temperature window compatible with its operation and its durability. This device is both simple and highly effective; a cold part kept in a temperature window of between 60 and 100° C. is achieved.

Figure 6A:
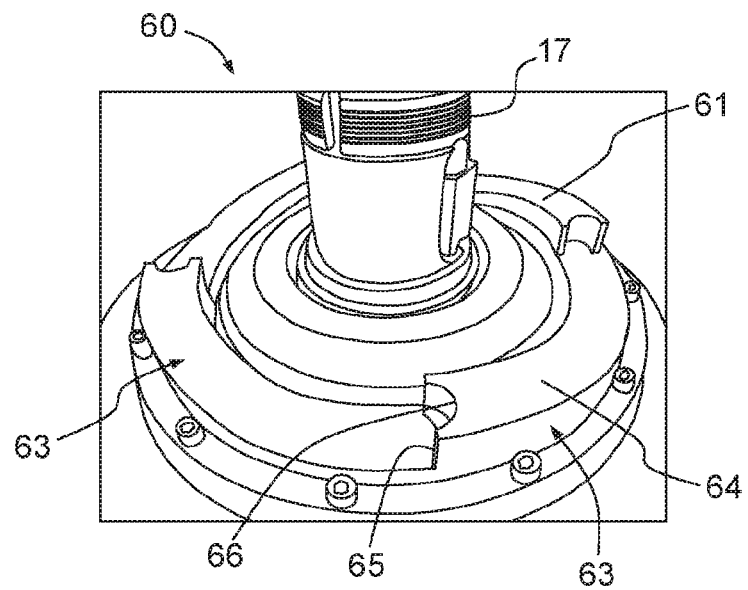
FIGS. 6*a*, 6*b* and 6*c* illustrate an anti-backspin device used in the preferred embodiment of the invention.
Figure 6B:
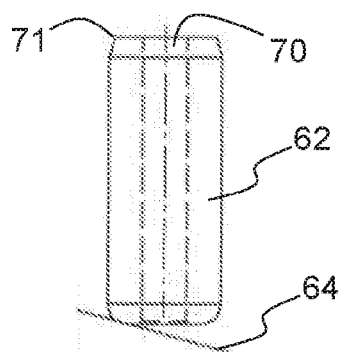

FIGS. 6a and 6b describe an immersed anti-backspin device used in the preferred embodiment of the invention. The reliability of the pump is key to the safety of the installation. It is necessary to ensure that the direction of pumping cannot be reversed upon a deliberate or unintentional stoppage of the pump. This is because when a motor-driven pump is stopped while other components are still turning, the pressure on the delivery side of the pump is higher than the pressure on the intake side. A reverse flow passes through the motor-driven pump and turns it in the opposite direction. The speed may be high and exceed the limit that is acceptable, both on the dynamic, hydraulic and mechanical viewpoint.

For that reason, the motor-driven pump according to the invention comprises an anti-backspin device able mechanically to prevent the shaft from rotating in a predetermined direction. The anti-backspin device 60, immersed in the coolant, comprises a fixed part 61 and a mobile part 81 secured to shaft. The mobile part has not been depicted in FIGS. 6a, 6b and 6c. In a preferred embodiment of the present invention, it is the flywheel 23 described earlier. In that case, the fixed part may be formed on a surface of the thermal barrier 14 facing the flywheel 23. This embodiment is depicted in FIG. 5a.

The mobile part 81 of the anti-backspin device 60 comprises at least one cavity 80 facing the fixed part 61, and at least one mobile pin 62. The anti-backspin device 60 is configured so that as soon as the shaft 17 is turned at a sufficiently high speed, the at least one mobile pin 62 is held inside the said cavity 80 by the effect of centrifugal force. When the rotational speed of the mobile part 81 drops below a predetermined threshold, the mobile pin 62 drops down under the effect of gravity and partially leaves the cavity 80.

The fixed part 61 comprises at least one ramp 63 made up of two inclined planes 64 and 65, a first plane 64 of shallow gradient and a second plane 65 of steep gradient. In the embodiment depicted in FIGS. 6a, 6b and 6c, the second plane 65 is vertical. It also comprises an indentation 66 into which the pin 62 may become inserted when it drops under the effect of gravity, if the rotational speed is sufficiently low.

Thus, the principle behind the anti-backspin device is as follows: when the motor-driven pump is started up, the pin 62 partially inserted into the cavity 80 is rotationally driven in the permitted direction and therefore climbs the shallow-gradient plane 64 before dropping back down into the indentation 66 formed in the steep-gradient plane 65. When the rotational speed exceeds the predetermined threshold, centrifugal force keeps the pin 62 in position in the cavity 80. As soon as the speed drops below this threshold, the reverse happens; the pin 62 drops under the effect of gravity. If necessary, a reversal of the direction of rotation of the shaft 17 drives the pin 62 against the indentation 66 of the plane 65. The steep gradient of the plane 65 (the plane is vertical in the embodiment depicted in the figures) prevents the pin 62 from climbing this plane 65 and thus blocks the rotation of the shaft 17 in the non-permitted direction.

In other words, the anti-backspin device 60 is considered so that, below the speed threshold:

the pin 62 is pushed back into the cavity 80 by contact with the shallow-gradient inclined plane 64, when the mobile part 81 is turning in a permitted direction of rotation, the portion of pin 62 outside the cavity 80 blocks the rotation through contact with the steep-gradient inclined plane 65 when the mobile part 81 is turning in the opposite direction.

There are a number of embodiments envisioned for this anti-backspin device. In the preferred embodiment of the invention depicted in FIGS. 6a, 6b and 6c, the mobile part 81 is formed in the flywheel 23. One, or preferably several, cavities 80 are formed in the lower surface of the flywheel. The cavities have an internal shape that is substantially cylindrical along an axis parallel to the longitudinal axis of the shaft 17. The anti-backspin device therefore comprises as many pins 62 as there are cavities 80. The pins 62 externally are of substantially cylindrical shape along a main axis, and are designed to slide in the cavity 80 along the longitudinal axis under the effect of gravity. Likewise, an arc-shaped indentation 66 is formed in the vertical plane 65 with a shape suited to the cylindrical pin 62.

Figure 6C:
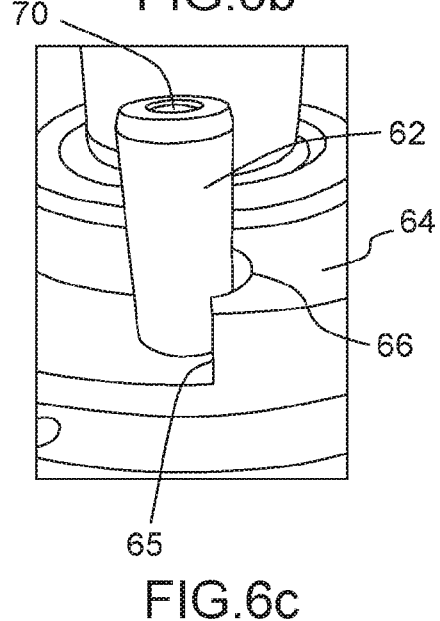

As depicted in FIGS. 6b and 6c, the pins 62 may comprise an open-ended duct 70, formed at the center of the pin and substantially parallel to the main axis of the pin 62. The open-ended duct 70 makes it easier for coolant to flow inside the cavity 80 as the pin 62 moves.

The at least one pin 62 may also comprise a chamfered profile or a rounded profile 71 at its two longitudinal ends. The chamfered profile or the rounded profile 71 depicted in side view in FIG. 6b is there to break the right angle between the base of the cylinder and a generatrix of the cylinder. This configuration advantageously makes it easier for the pin to ascend the shallower-gradient plane 64, and makes it possible to limit the impact between the mobile part and the fixed part 61 below the predetermined speed threshold.

As mentioned earlier on, an anti-backspin device comprising a plurality of cavities 80 and of pins 62 is envisioned. The cavities 80 are therefore formed at equal distances from the axis of rotation of the shaft 17 and evenly angularly distributed about the circumference of the mobile part 81. For example, the device comprises four cavities 80 comprising four pins 62 arranged at four cardinal points of the flywheel 23.

An anti-backspin device comprising the same number of cavities 80 and of ramps 63 is also envisioned. The ramps 63 may be formed on the fixed part 61 facing the cavities 80 of the mobile part 81 and evenly angularly distributed about the circumference of the fixed part 61. In the example depicted in FIG. 6a, four ramps 64 are formed at four cardinal points on a surface of the thermal barrier 14 facing the flywheel 23. Configured in this way, rotational blockage is the result of contact of each of the pins 62 with a ramp 65 with the fixed part. The torque generated on the shaft is advantageously spread across each of the pins.

In an alternative configuration, the anti-backspin device comprises a different number of cavities 80 and of ramps 63. For example, the device comprises the four cavities 80 already mentioned and comprises five ramps formed on the thermal barrier 14. In that case, rotational blocking is the result of contact of just one pin 62 with just one ramp 65. This configuration offers several advantages. Increasing the number of ramps 63 makes it possible to reduce the angular travel of the shaft before its rotation is blocked. Furthermore, by using a different number of pins 62 from ramps 63, rotational blockage is performed by a single pin 62. During successive stoppages of the motor-driven pump, a different pin may be called upon to block rotation, thus making it possible to limit the mechanical stress on the pins.

The anti-backspin device according to the invention is immersed, its components are exposed to high mechanical stresses. The device must therefore be able to offer a substantial opposing torque in the forbidden direction of rotation, typically of the order of 1000 Nm. In the acceleration and deceleration phases below the predetermined speed threshold, typically of the order of 180 revolutions per minute, the components need to be able to withstand the repeated impact of the pins against the ramps. In order to meet these requirements, the pins are advantageously made of stainless or, alternatively, of an alloy of the Inconel type. It is also envisioned for at least a surface portion of the ramps, of the pins or of the cavities to be mechanically strengthened using a surface hardening process. What is meant by a surface hardening is a surface treatment or the use of a coating. A surface treatment using a PVD, which stands for Phase Vapor Deposition, process is envisioned.

Let us note in conclusion that, in the embodiment depicted in the figures, the motor-driven centrifugal pump is mounted vertically on the reactor. In this configuration, the anti-backspin device 60 comprises cavities configured to allow their pin 62 a vertical movement. A reduction in the rotational speed below the predetermined threshold causes all the pins of the anti-backspin device to drop. This embodiment is nonlimiting of the invention. It also for example envisions a motor-driven centrifugal pump mounted horizontally; the axis of rotation of the shaft being horizontal. In that case, the anti-backspin device comprises cavities configured to allow their pin a radial movement. The pins are pressed firmly into the bottoms of the cavity by the effect of centrifugal force. A reduction in the rotational speed below the predetermined threshold causes some of the pins of the anti-backspin device to drop; the pins situated below the axis of the shaft remaining fully in their cavity. Only the pins situated above the axis of rotation contribute to the mechanical blocking of the rotation. For this configuration, a high number of cavities, pins and ramps will be preferred.

The invention claimed is:

1. A motor-driven centrifugal pump for circulating a coolant in a primary circuit of a nuclear reactor, the motor-driven pump comprising:
    a sealed motor unit comprising a dry stator and an immersed rotor;
    a hydraulic part comprising an impeller; and
    a shaft which is immersed in the coolant and is configured to be turned by the sealed motor unit to pump the coolant via the impeller of the hydraulic part, the impeller of the hydraulic part and the immersed rotor of the motor unit are each secured to the shaft;
    an immersed flywheel mounted securely on the shaft between the immersed rotor of the motor unit and the impeller of the hydraulic part, the immersed flywheel is configured to ensure a minimum slowing-down time when the motor unit ceases to turn the shaft; and
    an immersed anti-backspin device that is configured to mechanically block the rotation of the shaft in a predetermined direction, the immersed anti-backspin device comprising a fixed part and a mobile part secured to the shaft, wherein
    said mobile part comprises at least one cavity facing the fixed part and at least one mobile pin that is configured to be held inside said at least one cavity via a centrifugal force and a portion of said at least one mobile pin is configured to partially leave the at least one cavity under the effect of gravity when a rotational speed of the mobile part drops below a predetermined threshold,
    said fixed part comprises at least one ramp having two inclined planes including a first plane having a first gradient and a second plane having a second gradient the second gradient being steeper than the first gradient,
    the anti-backspin device is configured such that when the rotational speed of the mobile part drops below the predetermined threshold:
    said at least one mobile pin is pushed into the at least one cavity by contact with the first plane when the mobile part is turning in a permitted direction of rotation, and
    said portion of said at least one mobile pin outside of the at least one cavity blocks rotation of the mobile part in a direction opposite the permitted direction of rotation by contact with the second plane,
    the at least one mobile pin has a substantially cylindrical external shape along a main axis of the at least one mobile pin, and the at least one cavity has a substantially cylindrical internal shape along the main axis of the at least one mobile pin, and
    the at least one mobile pin comprises an open-ended duct that extends substantially parallel to the main axis of the at least one mobile pin and that eases coolant flow inside the at least one cavity as said at least one mobile pin moves.

2. The motor-driven centrifugal pump as claimed in claim 1, wherein the mobile part of the anti-backspin device is provided in the flywheel thus defining an integrated subassembly.

3. The motor-driven centrifugal pump as claimed in claim 1, wherein the at least one pin comprises a chamfered profile or a rounded profile at least at one end to make it easier for said pin to ascend the first plane and to limit the impact between the mobile part and the fixed part.

4. The motor-driven centrifugal pump as claimed in claim 1, wherein
the at least one mobile pin includes a plurality of mobile pins,
the at least one cavity includes a plurality of cavities,
the plurality of mobile pins and cavities are respectively provided at equal distances from an axis of rotation of the shaft and evenly angularly distributed in the mobile part, and
the at least one ramp includes a corresponding number of ramps evenly distributed on the fixed part such that rotational blocking is the result of contact of each of the mobile pins with a respective ramp.

5. The motor-driven centrifugal pump as claimed in claim 1, further comprising a thermal barrier between the motor unit and the hydraulic part that is configured to thermally isolate the motor unit from a primary circuit, wherein
the shaft passes through the thermal barrier between the immersed flywheel and the impeller.

6. The motor-driven centrifugal pump as claimed in claim 4, mounted vertically and wherein the at least one cavity is configured to allow a vertical movement of the pin in the at least one cavity.

7. The motor-driven centrifugal pump as claimed in claim 1, wherein
the at least one mobile pin includes a plurality of mobile pins,
the at least one cavity includes a plurality of cavities,
the plurality of mobile pins and cavities are respectively provided at equal distances from an axis of rotation of the shaft and evenly distributed in the mobile part, and
the at least one ramp includes a distinct number of ramps evenly distributed on the fixed part such that rotational blocking is the result of contact of a single respective mobile pin with a respective ramp.

8. The motor-driven centrifugal pump as claimed in claim 1, wherein at least a surface portion of the at least one ramp, of the at least one pin, or of the at least one cavity is mechanically strengthened by a surface hardening process.

9. The motor-driven centrifugal pump as claimed in claim 1, wherein at least one portion of the at least one ramp, of the at least one pin, or of the at least one cavity is made of a metal alloy having enhanced mechanical strength.

10. The motor-driven centrifugal pump as claimed in claim 5, wherein the fixed part is provided on a surface of the thermal barrier that faces the mobile part.

11. The motor-driven centrifugal pump as claimed in claim 4, mounted horizontally and wherein the at least one cavity is configured to allow a radial movement of the pin in the at least one cavity.

* * * * *